Feb. 25, 1930.  C. H. GREGORIE  1,748,764
INSECTPROOF BREAD AND CAKE BOX CONSTRUCTION
Filed March 10, 1926   2 Sheets-Sheet 1
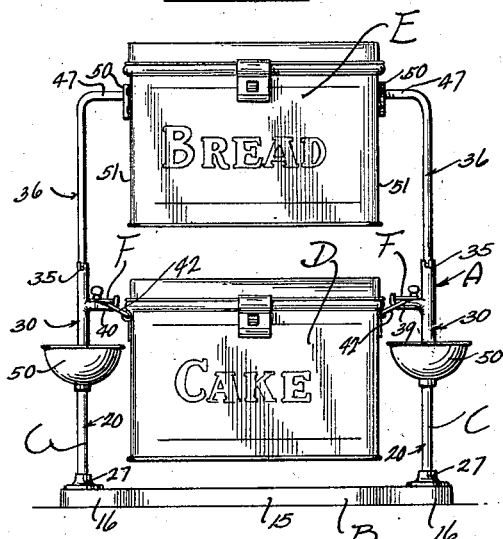
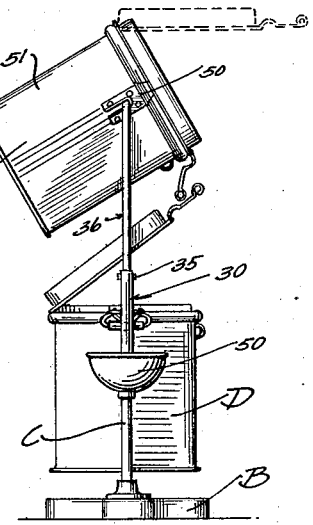
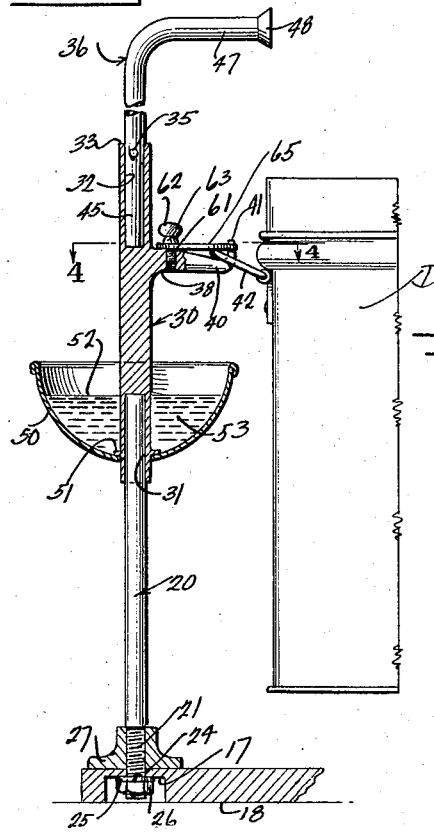
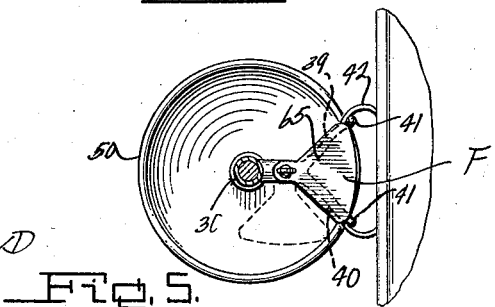
Inventor
Charles H Gregorie Feb. 25, 1930. C. H. GREGORIE 1,748,764
INSECTPROOF BREAD AND CAKE BOX CONSTRUCTION
Filed March 10, 1926   2 Sheets-Sheet 2
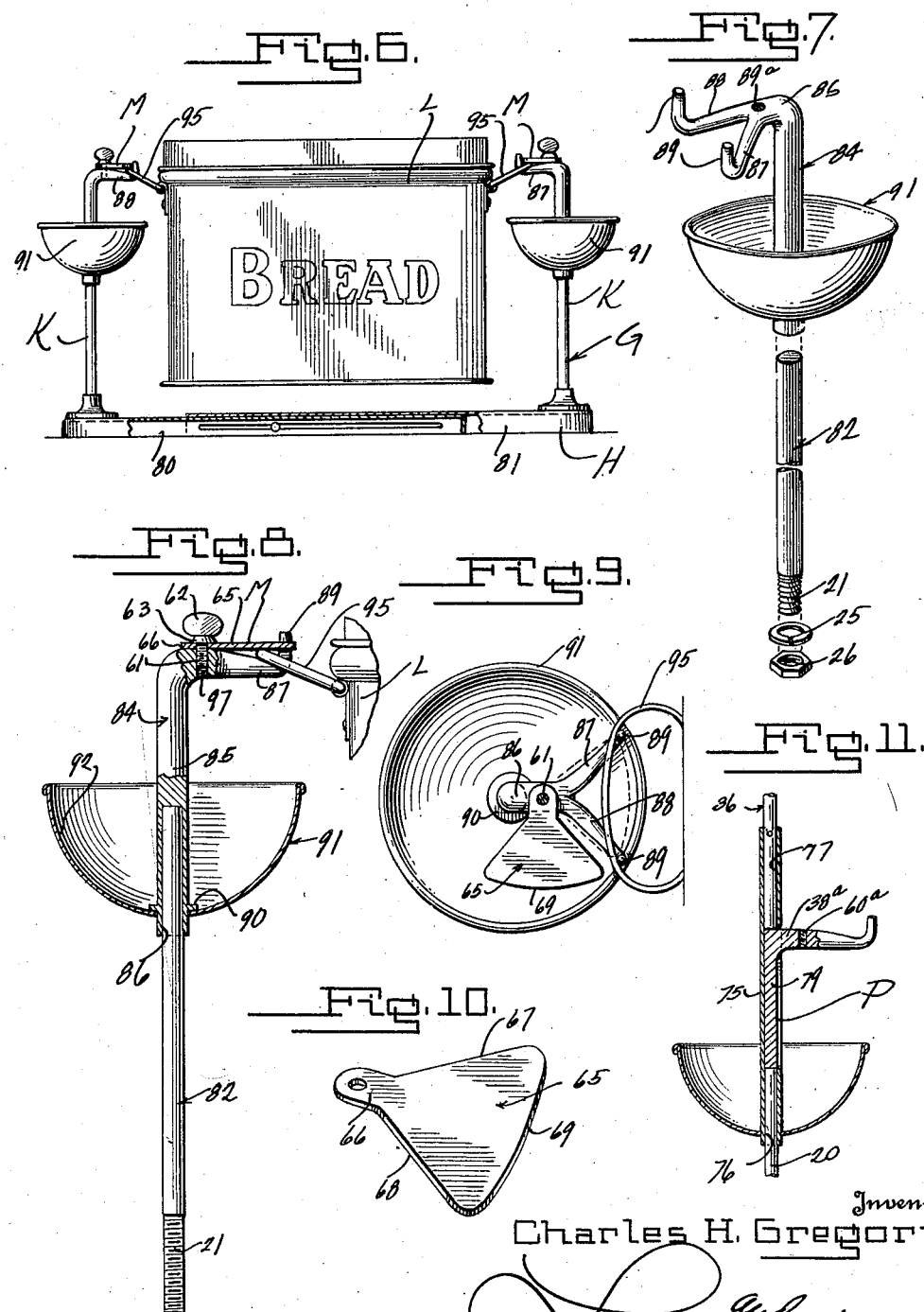

Patented Feb. 25, 1930

1,748,764

UNITED STATES PATENT OFFICE

CHARLES HENRY GREGORIE, OF MACON, GEORGIA

INSECTPROOF BREAD AND CAKE BOX CONSTRUCTION

Application filed March 10, 1926. Serial No. 93,775.

This invention relates to improvements in an insect-proof bread and cake box construction.

The primary object of this invention is the provision of improved means for supporting bread or cake boxes, in such manner that crawling insects cannot reach the same, and in such manner that a person with ease may remove the contents of the box or boxes.

A further object of this invention is the provision of an improved insect proof bread and cake box construction, such as set forth in my Patent No. 1,507,731, granted September 9, 1924 and No. 1,549,414, granted August 11, 1925, and embodying improvements thereover for detachably retaining the box or container in a stable and yet easily accessible relation in a suspended position.

A further object of this invention is the provision of a novel clamp for retaining the handles of a bread box construction in a supported relation upon a standard.

A further object of this invention is the provision of an improved double deck type of bread and cake box construction, embodying a novel standard arrangement for cooperably supporting two receptacles, one of which is adapted to receive cake and the other bread.

Other objects and advantages of this invention will be apparent during the course of the following detailed description.

In the accompanying drawings, forming a part of this specification, and wherein similar reference characters designate corresponding parts throughout the several views, Figure 1 is a front elevation of the improved double deck type of bread and cake box supporting construction, showing the boxes in their normally supported closed position.

Figure 2 is a side elevation of the improved cake and bread holder construction, showing the same in the position to which they may be moved for permitting removal of the contents of the lower box.

Figure 3 is an enlarged fragmentary sectional view taken through one of the standards of the double deck bread and cake box construction.

Figure 4 is a sectional view taken substantially on the line 4—4 of Figure 3.

Figure 5 is a fragmentary perspective view of a supporting standard portion embodied as a part of this invention.

Figure 6 is a front elevation, partly in section, showing the novel supporting construction for supporting a single type of receptacle, such as a bread box.

Figure 7 is a fragmentary perspective view of standard details of the invention for supporting a bread or cake box.

Figure 8 is a side elevation, partly in section, showing a standard and trap construction and clamp means for holding a handle of a container in supported relation on the standard.

Figure 9 is a plan view of one of the standards of the improved construction, showing the clamp swung to permit removal or placement of the handle of a bread box in supported relation upon the standard.

Figure 10 is a perspective view of a novel clamp member.

Figure 11 is a fragmentary sectional view taken longitudinally of a modified form of standard construction, which may be provided in lieu of the construction illustrated in Figure 3.

In the drawings, wherein for the purpose of illustration are shown preferred and modified forms of this invention, the letter A may generally designate the improved double deck type of insect proof bread and cake box construction, which may comprise a base B; side standard construction C adapted to support a lower cake box D and a hinged upper bread box E in a cooperative relation; novel clamps F being provided in connection with the side standard construction C for the purpose of retaining the lower receptacle D in a secure relation upon the standard construction.

A type of insect proof bread and cake box construction G may be provided, following somewhat the construction of the form of insect proof bread and cake box construction A, and including side standards K supporting a single receptacle L and also embodying clamps M identically similar to the clamps F above referred to for retaining the box L against displacement from the standards K. A modified standard construction P may be used in lieu of the standard construction C above described.

Referring to the form of invention A, the base B may be of any approved construction, either of the extensible or non-extensible type. In the preferred instance, it is constructed of a single piece of material as illustrated in Figure 1 of the drawings, and includes the body portion 15, with end extensions 16 upon the latter of which the standard constructions C are mounted. The extensions 16 are preferably provided with openings or sockets 17 extending upwardly from the lower surface 18 thereof.

The standard constructions C each include a lower standard portion 20, having a preferably reduced screw threaded shank 21 at the lower end thereof adapted to be slipped through an opening 24 in the extensions 16 of the base B, so that the lower end thereof projects into the pocket 17, and there detachably receives a split washer 25 and a detachable nut 26, the latter of which operates entirely within the pocket 17 to clamp the lower standard portion 20 in position. A collar 27 is provided for the lower standard portion 20, having an opening therein through which the screw threaded shank 21 extends, and in which it is preferably permanently located; the lower surface of the collar 27 resting upon the top surface of the base extension 16, to support the lower standard portion 20 in vertical relation. The standard portion 20 is preferably solid and at the upper end thereof the same is of uniform diameter.

An intermediate standard portion 30 is preferably provided as a part of each of the standard constructions C, and this standard construction 30 is preferably solid at the intermediate portion thereof, but at the lower end thereof it is tubular and provides the downwardly open socket opening 31 to detachably receive the upper end of the lower standard portion 20, as is illustrated in Figure 3 of the drawings. The intermediate standard 30 at the upper end thereof is also provided with a socket opening 32, and inwardly from the top edge 33 of the intermediate standard portion 30 the same is downwardly recessed at 34, at diametrically opposed points, to provide retaining notches for receiving laterally extending retaining pins 35 formed on the upper standard portion 36 which will be subsequently described.

Intermediate its ends the intermediate standard portion 30 is preferably provided with a right angled supporting arm construction consisting of a shank 38 which extends in right angled relation from the body of the intermediate standard portion 30, and at the free end thereof is provided with the divergent supporting arms 39 and 40, which at the free ends thereof have retaining fingers 41. This supporting arm construction may be readily termed a hook construction for receiving the handle or bail 42 of the cake box receptacle D, as will be more specifically described hereinafter. The upper surfaces of the arms 39 and 40 slope gradually downward towards the hooked ends or fingered ends 41, as illustrated in Figure 3 of the drawings.

The upper standard portion 36 is provided with a lower end 45 which seats within the socket or recess 32 of the intermediate standard portion 30, and the retaining pins 35 are diametrically opposed for seating in the notches 34 to prevent the upper standard portion 36 from rotation with respect to the standard portion 30. This is important, for at the upper end the upper standard portion 36 includes a right angled supporting extension 47, which at the free end thereof is provided with a head 48 adapted to be detachably slipped in a retaining socket or analogous construction 50 formed at the side wall 51 of the bread receptacle E.

In position upon the base B the standards C are disposed at opposite sides thereof, with the supporting arms 39 and 40 of the standard constructions C facing inwardly, and the upper supporting arms 47 also facing inwardly.

The cake receptacle D as above mentioned has the bail portions 42 supported at each of the side walls thereof, and these bails or handles are hooked over the supporting arms 39 and 40 and engage against the fingers 41 to suspend the cake receptacle D with its bottom surface above the top surface of the base B, as illustrated in the drawings. The fact that the arms 39 and 40 are divergent prevent the receptacle D from swinging, and the clamp structures F which will be subsequently described are provided to releasably hold the bails 42 in position against detachment and to maintain the cake receptacle D stationary in its suspended plane.

The upper receptacle E is a bread box receptacle, and at the side walls thereof the sockets 50 are provided of any approved construction, which detachably receive the head portions 48 of the upper supporting brackets 36 therein, in such manner as to hingedly or swingably mount the bread box receptacle E for swinging in a vertical plane between the side standards C.

The intermediate standard portions 30 of each of the standard constructions C is preferably provided with a trap or bowl 50, which in the lower end thereof is provided with an opening adapted to receive the lower end of the intermediate standard portion 30 therein, until the inner surface of the trap 50 abuts against an annular flange 51 provided on the intermediate standard portion 30, and when the parts are thus assembled the trap 50 is soldered about the opening to the flange 51 or the standard portion 30. The pocket 52 of the trap 50 of course faces upwardly and the upper end of the intermediate standard section 30 projects upwardly thru the opening 52, at the center thereof, and thus the opening 52 annularly surrounds the standard 30. The trap 50 is of bowl-shaped formation, and adapted to receive an insecticide or germicide liquid 53, into which insects will fall if they attempt to crawl up the standard construction C, so as to prevent their access to either of the receptacles D and E, as is readily obvious.

Referring to the novel clamp construction F, a screw threaded opening 60 is preferably provided in the supporting shank 38 of each standard construction C, and in this screw threaded opening 60 is adjustably received a screw threaded clamping bolt 61 having a thumb engaging head 62 thereon and a shoulder 63. A clamping plate 65 of triangular formation is provided as the clamping member for retaining the bail 42 in position, and the same has an apertured extension 66 at an apex thereof, which receives the shank of the bolt 61, to swively mount the clamping plate or member 65 in position. From the pivot end of the plate 65 the same increases in width, with the side edges 67 and 68 thereof diverging, and at its free edge 68 the same is arcuated preferably concentric with the axis of the bolt 61. The length of the retaining member or plate 65 is such that the free edge 69 thereof barely misses the retaining fingers 41 of the supporting arms 39 and 40, when the said plate or member 65 is being swung into or out of bail retaining relation. As is illustrated in Figure 4 the retaining member 65 may be swung across the bail 42 to retain the same in a stable and non-detachable position, where the same and the retaining member may be swung as illustrated in dotted lines in Figure 4 to permit removal of the bail 42 and detachment of the receptacle D for cleansing purposes.

A modified form of intermediate standard section P is illustrated for the standard construction of the double deck type of insect proof bread and cake box construction, and the same may comprise a tubular body 75, which at the upper and lower ends thereof is provided with sockets 76 and 77 formed to detachably receive the lower and upper standard sections 20 and 36 therein, as above described. The tubular body 75 is slotted intermediate its ends or otherwise formed to permit the placement of a solid cylindrical portion 79 therein, which is soldered or welded in place and integral with this portion 79 is the right angled shank 38ª similar to the shank 38 above mentioned. The shank 38ª has a screw threaded opening 60ª therein similar to the opening 60 above described, and the right angled supporting construction is otherwise formed similar to that above described for the intermediate standard section 30.

Referring to the modified form of insect proof construction G, the same includes a base H which may comprise extensible sections 80 and 81.

The standard construction K may be mounted at the outer ends of the sections 80 and 81 of the base, and these standard constructions K each includes a lower standard portion 82 formed identically the same as the standard construction 20 above described, in so far as its attachment to the base sections are concerned, and the same reference characters have been given the parts of the standard section 82 as are applied in the above description to the standard section 20.

Each of the standard constructions K furthermore includes a second standard portion 84, which is mounted directly upon the top of the lower standard section 82, in a detachable relation thereon, and this standard construction 84 includes a vertical body portion 85, which inwardly from the lower end thereof is provided with an open socket 86 adapted to detachably receive the upper end of the standard 82. At its extreme upper end the body 85 is provided with a right angled shank 86, having at the free end thereof the divergent receptacle supporting arms 87 and 88 which at the free ends thereof are provided with the hooked or upturned fingers 89.

At its lower end the body 85 of the second standard portion 84 is provided with an annular flange 90, and a trap 91 is provided, of bowl-shaped formation, provided with an aperture in the lower end thereof, through which the lower tubular end of the standard body 85 is slipped, until the trap 91 abuts the flange 90, and the same are then connected by a leak-proof soldered joint. In this manner the body 85 of the upper standard portion 84 extends upwardly through the center of the compartment 92 formed by the trap 91, so that an insecticide liquid in the compartment or pocket 92 will surround the standard portion 84, as is readily obvious, and at a point below the laterally extending supporting construction which supports the receptacle L.

The form of invention G is preferably adapted to support only a single receptacle L, and the bails 95 thereof are hooked over the supporting arms 87 and 88 and retain the receptacle L in suspended relation by means of retaining hooks or fingers 89.

The clamping construction M for each of the standard constructions K is the same as above described for the clamping construction F, and the same reference characters have been applied thereto as are applied to the clamping construction F. The screw threaded bolt or clamping member 61 engages in a screw threaded opening 97 formed in the right angled supporting shank 86 above described.

From the foregoing description of this invention it is apparent that a novel insect proof bread and cake box construction has been provided, which includes novel improvements in cooperatively mounting a double decker type of box construction; the supporting standard constructions being novel in certain structural features for retaining the bread or cake receptacles thereon in an efficient and easily removable relation.

Various changes in the shape, size, and arrangement of parts may be made to the forms of invention herein shown and described, without departing from the spirit of the same or the scope of the claims.

I claim:

1. In a device for preventing insects from gaining access to articles, a base, spaced upwardly extending standards, inwardly facing laterally extending supporting arms carried by said standards, liquid receiving traps carried by the standards below said supporting arms, clamp members movably connected on each of said supporting arms, a receptacle, and movable handle means connected with the receptacle for support upon said supporting arms adapted to be clamped thereon against swinging movement by said movable clamp members at a location between said traps.

2. In a device for preventing insects from gaining access to articles, a base, spaced upwardly extending standards carried by the base, laterally extending divergent arms carried by each of said standards in inwardly facing relation, a receptacle, bails on the receptacle adapted for connection to said divergent supporting arms of each of the standards with the receptacle supported in suspended relation thereby above the base, and a clamping member movably associated with the divergent arms of each of said standards to engage the respective bail connected thereto, to prevent swinging movement of the receptacle.

3. In a device for preventing insects from gaining access to articles, a base, spaced upwardly extending standards carried by the base, a laterally extending shank connected with each of said standards, divergent supporting arms at the outer ends of each of said shanks, each of said shanks having a screw threaded opening therethrough, a clamping plate for each of the shanks and diverging supporting arms thereof, and a clamping bolt for swivelly mounting the clamping plate by engagement of the clamping bolt in the screw threaded opening of the respective shanks, said divergent arms at the outer ends thereof having retaining fingers, and said device being adapted to receive a receptacle with bails which may be hooked over the retaining fingers and clamped on the supporting arms against swinging movement by means of said clamp plate which may be swung into or out of the retaining position with respect to said bails incident to its pivotal mounting.

4. In a device for preventing insects from gaining access to articles, a base, standards in spaced relation above said base, each standard including an upwardly extending lower standard portion carried by the base, an intermediate standard portion detachably carried at the upper end of said lower standard portion, and an upper standard portion detachably connected in a non-rotatable relation at the upper end of said intermediate standard portion, the upper standard portions having inwardly extending supporting arms, an upper receptacle swivelly connected to said supporting arms, the intermediate standard portions having laterally extending supporting arms thereon, a lower receptacle supported on the last mentioned supporting arms in a stationary relation, liquid receiving trap means carried by said standards in surrounding relation thereto below the supporting arms which supports the lower receptacle, and means for clamping the lower receptacle in a stationary non-swingable relation on the supporting arms of the intermediate standard portions.

5. In a device for preventing insects from gaining access to articles the combination of a supporting base, relatively spaced upwardly extending standards carried by the base, stub arms laterally extending from the standards towards each other, movable clamp members connected with said stub arms, and a receptacle suspended upon said stub arms and releasably clamped in position by said clamp members.

CHARLES HENRY GREGORIE.